(12) United States Patent
Nakano et al.

(10) Patent No.: US 9,889,744 B2
(45) Date of Patent: Feb. 13, 2018

(54) VEHICLE TRACTION CONTROL APPARATUS

(71) Applicant: Mitsubishi Electric Corporation, Tokyo (JP)

(72) Inventors: Kotaro Nakano, Tokyo (JP); Hiroyuki Kobayashi, Kobe (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/028,459

(22) PCT Filed: Mar. 31, 2014

(86) PCT No.: PCT/JP2014/059539
§ 371 (c)(1),
(2) Date: Apr. 11, 2016

(87) PCT Pub. No.: WO2015/151193
PCT Pub. Date: Oct. 8, 2015

(65) Prior Publication Data
US 2016/0250929 A1   Sep. 1, 2016

(51) Int. Cl.
*B60L 3/10* (2006.01)
*B60L 15/20* (2006.01)
*B60L 11/18* (2006.01)

(52) U.S. Cl.
CPC ......... *B60L 3/102* (2013.01); *B60L 11/1803* (2013.01); *B60L 11/1861* (2013.01); *B60L 15/20* (2013.01); *B60L 15/2009* (2013.01); *B60L 15/2018* (2013.01); *B60L 2240/12* (2013.01); *B60L 2240/421* (2013.01); *B60L 2240/423* (2013.01); *B60L 2240/429* (2013.01); *B60L 2240/461* (2013.01); *B60L 2240/465* (2013.01); *B60L 2240/642* (2013.01); *B60L 2240/647* (2013.01); *B60L 2240/80* (2013.01);
(Continued)

(58) Field of Classification Search
CPC .. B60L 3/102; B60L 11/1803; B60L 11/1861; B60L 15/20; B60L 15/2009; B60L 15/2018
See application file for complete search history.

(56) References Cited

U.S. PATENT DOCUMENTS

2009/0115246 A1* 5/2009 Yanagida ............... B60K 28/16
303/144

FOREIGN PATENT DOCUMENTS

JP    8-182119 A    7/1996
WO    2015/063913 A1    5/2015

OTHER PUBLICATIONS

International Search Report for PCT/JP2014/059539 dated Jul. 1, 2014.

* cited by examiner

*Primary Examiner* — Michael D Lang
(74) *Attorney, Agent, or Firm* — Sughrue Mion, PLLC; Richard C. Turner

(57) ABSTRACT

In the case where a virtual vehicle speed selection means selects one of a first virtual vehicle speed and a second virtual vehicle speed so as to perform switching from the other one to said one of the first virtual vehicle speed and the second virtual vehicle speed, the rotation speed of an electric motor is decelerated to a threshold value with which travel of the vehicle stabilizes and the deceleration of the electric motor is stopped when the rotation speed of the electric (Continued)

motor becomes lower than the threshold value, and then traction of the vehicle is controlled based on the selected virtual vehicle speed.

8 Claims, 13 Drawing Sheets

(52) U.S. Cl.
CPC .......... *B60L 2260/44* (2013.01); *Y02T 10/645* (2013.01); *Y02T 10/7005* (2013.01); *Y02T 10/705* (2013.01); *Y02T 10/7044* (2013.01); *Y02T 10/7275* (2013.01); *Y02T 10/7291* (2013.01); *Y02T 90/16* (2013.01)

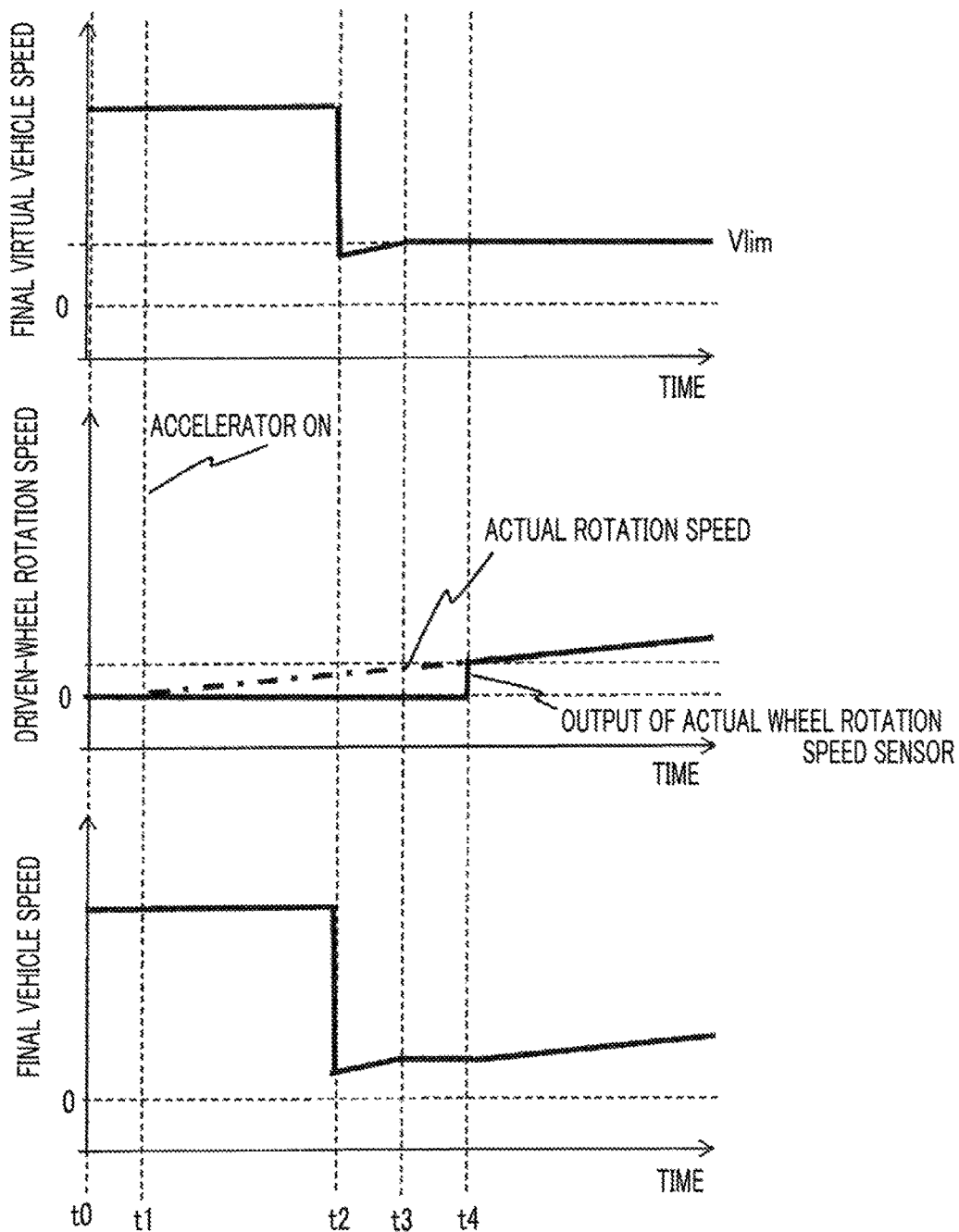

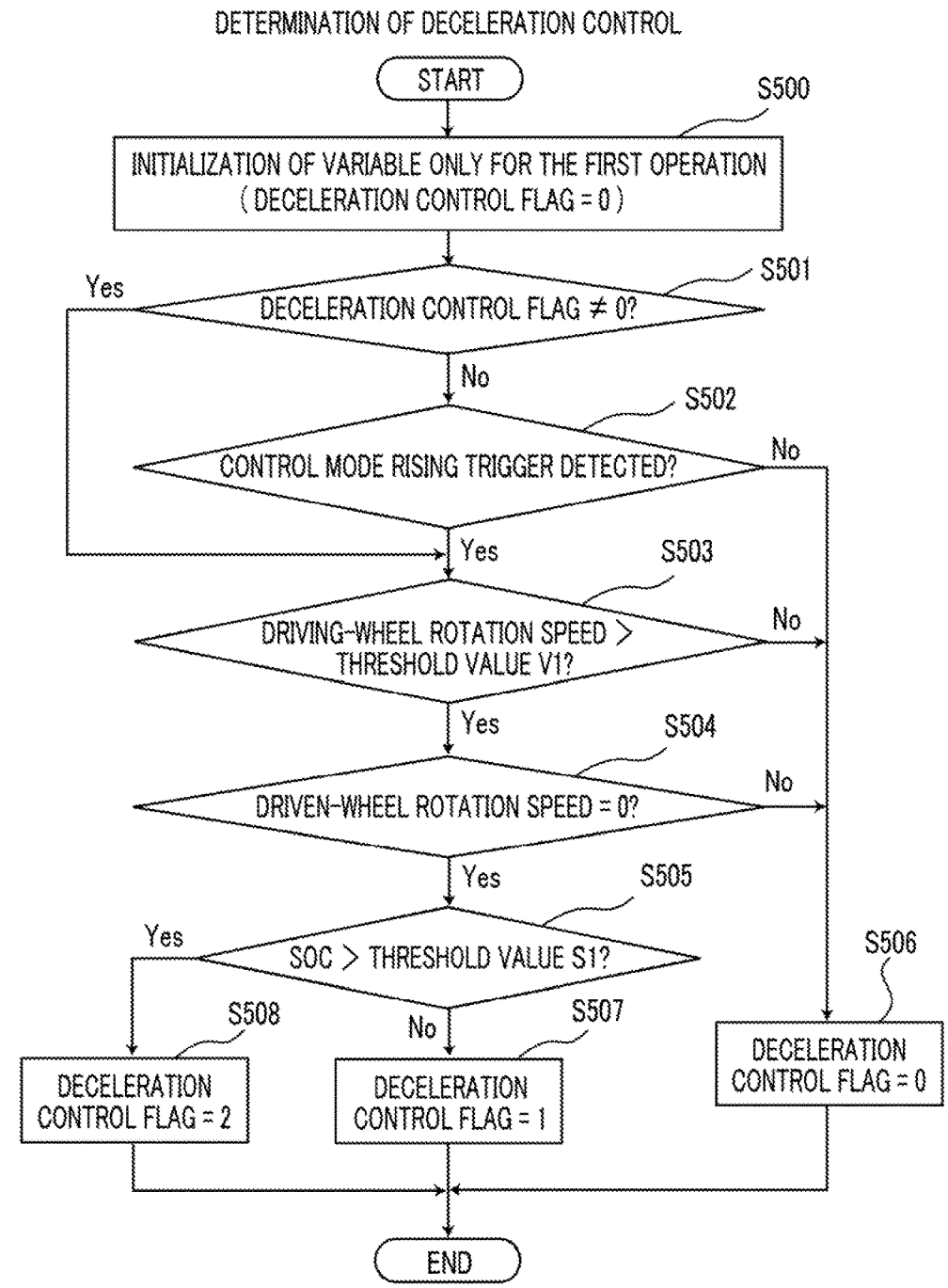

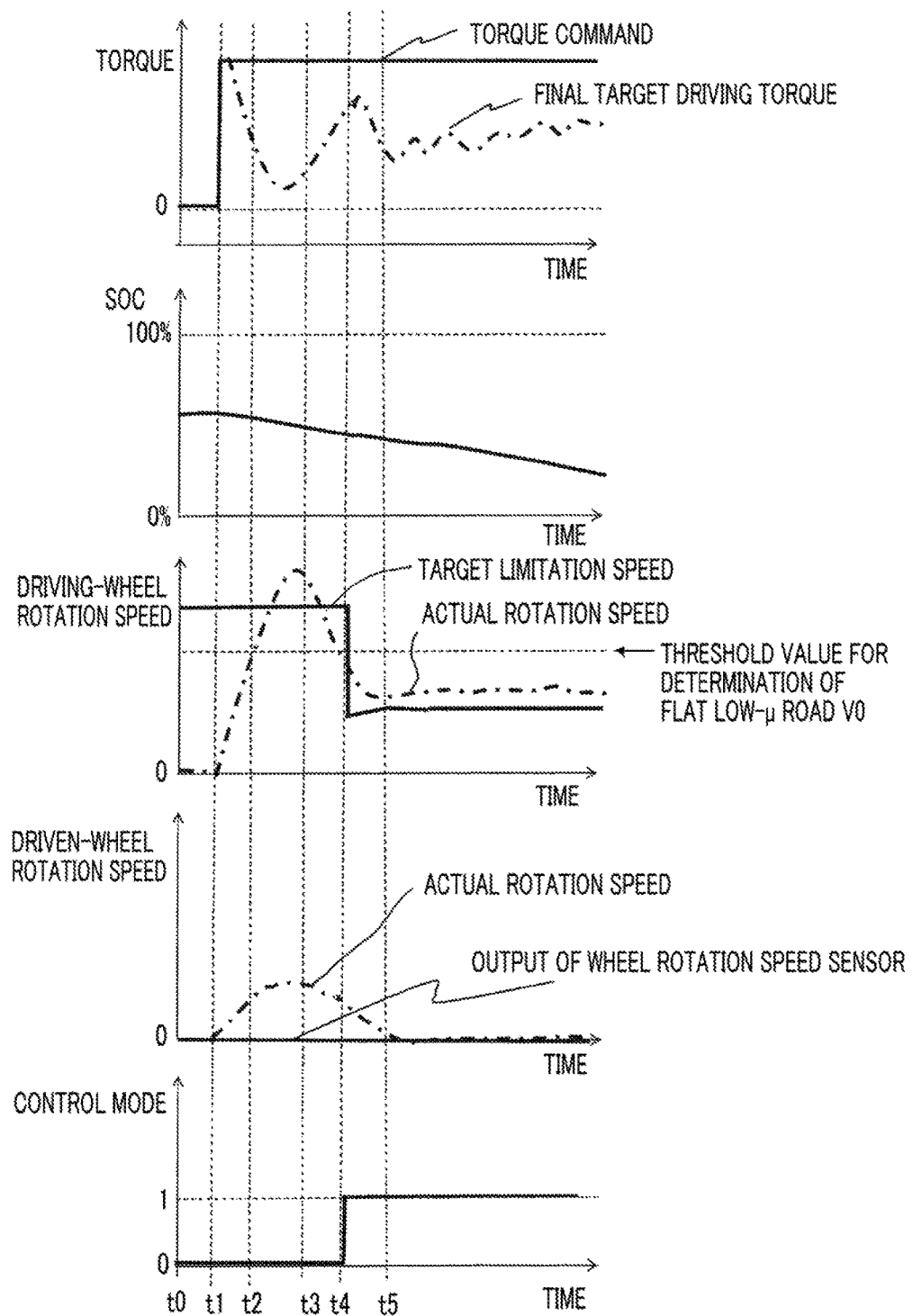

VEHICLE TRACTION CONTROL APPARATUS

CROSS REFERENCE TO RELATED APPLICATIONS

This application is a National Stage of International Application No. PCT/JP2014/059539 filed Mar. 31, 2014, the contents of which are incorporated herein by reference in their entirety.

TECHNICAL FIELD

The present invention relates to a vehicle traction control apparatus that suppresses driving wheels of a vehicle from slipping.

BACKGROUND ART

When a vehicle such as an automobile is started or accelerated, strong driving force transmitted from an internal combustion engine (hereinafter, referred to as an engine) or a motor (hereinafter, referred to as an electric motor), which is a driving source, may cause tires to spin (wheelspin) from time to time, due to the relationship between the friction coefficient of a traveling road surface and the driving force. In many cased, the wheelspin not only wastefully dissipates the driving force but also makes travel of the vehicle unstable, and hence poses a big problem also in terms of safety.

In general, in traction control of a vehicle, a wheelspin is comprehended based on the vehicle speed, the respective rotation speeds of the tires, and the like, and then driving force from the engine or the electric motor is adjusted so as to be reduced, so that the wheelspin is eliminated. As a result, especially on the road surface whose friction coefficient is decreased due to a snowfall or the like, the safety of the vehicle can be raised independent of the ability of a driver. However, in a conventional vehicle whose driving source is an engine or in a hybrid vehicle whose driving sources are an engine and an electric motor, the diver is required to finely adjust stepping-on of the accelerator pedal so as to prevent a wheelspin.

In contrast, the torque response of an electric motor mounted in an electric automobile is more than 10 times as fast as that of an engine; thus, even software alone may realize traction control whose performance is superior to that of traction control in a normal engine automobile.

In a conventional traction control apparatus for an electric automobile, disclosed in Patent Document 1, the occurrence of a slip of the driving wheel is determined based on whether or not the rotation speed of the driving wheel detected by an encoder-type wheel speed sensor has exceeded a threshold value, and then the driving torque is suppressed. However, in the case of this conventional apparatus, no slip of the driving wheel can be determined in a low-vehicle-speed region where the encoder-type wheel speed sensor cannot detect a slip; therefore, an initial slip at a time of starting cannot be suppressed.

Accordingly, in a traction control apparatus disclosed in Patent Document 2, for which an application for a patent has been made by the applicant, a virtual speed of a driven wheel is created in a low-vehicle-speed region where an encoder-type wheel speed sensor cannot detect a slip, and then the output torque is controlled for a target slip rate by use of the created virtual speed. In other words, the slipperiness of a road surface is determined based on an accelerator-on time and the rotation speed of a driving wheel (referred to also as a driven wheel; however, referred to as a driven wheel, hereinafter), and then the virtual speeds of the driven wheel are switched in accordance with the determined slipperiness of the road surface. The foregoing virtual speed is calculated in such a way as to become a smaller numerical value as the road surface is more slippery.

PRIOR ART REFERENCE

Patent Document

[Patent Document 1] Japanese Patent Application Laid-Open No. H8-182119
[Patent Document 2] International Patent Classification PCT/JP2013/079536

DISCLOSURE OF THE INVENTION

Problems to be Solved by the Invention

In the case of the apparatus disclosed in Patent Document 2, when the created virtual speeds are switched in accordance with the condition of the road surface at a time when the slip rate is large, traction control is implemented under the condition that the road-surface friction coefficient μ is low; therefore, the slip cannot sufficiently be suppressed. For example, in the case of the surface of a road such as an uphill road that has a low road-surface friction coefficient μ, it is required to consider the danger that when the virtual speeds are switched at a time when the slip rate is large, the vehicle slips off downward on the uphill road.

The present invention has been implemented in order to solve the foregoing problems in a conventional vehicle traction control apparatus; the objective thereof is to provide a vehicle traction control apparatus that can make a vehicle travel always stably even on a road surface having a large slip rate.

Means for Solving the Problems

A vehicle traction control apparatus according to the present invention includes an electric motor that is supplied with electric power from a battery and outputs driving power to driving wheels of a vehicle, a vehicle speed sensor that detects a wheel rotation speed of a driven wheel of the vehicle, and a target limitation speed creation means that determines a road-surface condition, based on target driving torque of the vehicle, a wheel rotation speed of the driven wheel, and a driver accelerator operating amount signal, so as to create a target limitation speed of the vehicle; the vehicle traction control apparatus is characterized in that target limitation speeds created by the target limitation speed creation means are stepwise switched in accordance with control modes that are categorized based on the slipperiness of a road surface in a speed region where no speed of the driving wheel can be detected, in that the rush current limiting circuit includes a control mode switching means that switches the control modes, based on a first virtual vehicle speed of the driven wheel calculated from an accelerator-on time based on the accelerator operating amount signal and a wheel rotation speed of the driven wheel, a virtual vehicle speed calculation means that calculates a second virtual vehicle speed of the driven wheel, based on a virtual acceleration corresponding to a control mode selected by the control mode switching means, and a virtual vehicle speed selection means that selects one of the first virtual vehicle speed and the second virtual vehicle speed, based on the determined road-surface condition, so as to perform switching from the other one to said one of the first virtual vehicle speed and the second virtual vehicle speed, and in that when the virtual vehicle speed selection means selects one of the first virtual vehicle speed and the second virtual vehicle speed so as to perform switching from the other one to said one of the first virtual vehicle speed and the second virtual vehicle speed, the rotation speed of the electric motor is decelerated to a threshold value with which the travel of the vehicle stabilizes and the deceleration of the electric motor is stopped when the rotation speed of the electric motor becomes lower than the threshold value, and then traction of the vehicle is controlled based on the selected virtual vehicle speed.

Advantage of the Invention

The vehicle traction control apparatus according to the present invention can make a vehicle travel always stably even on a road surface having a large slip rate.

BRIEF DESCRIPTION OF THE DRAWINGS

FIG. 8 is an explanatory chart representing the operation of the vehicle traction control apparatus according to Embodiment 1 of the present invention;

FIG. 9 is a flowchart representing the operation of a deceleration control determination means in the vehicle traction control apparatus according to Embodiment 1 of the present invention;

FIG. 10 is an explanatory chart for explaining the operation of a conventional apparatus;

BEST MODE FOR CARRYING OUT THE INVENTION

Embodiment 1

Figure 1:
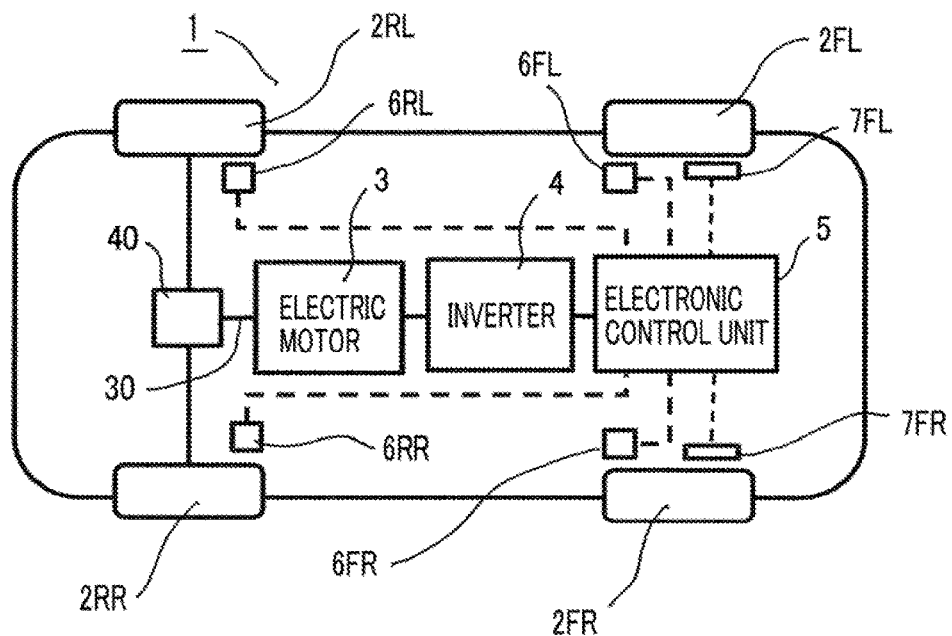
FIG. 1 is a configuration diagram illustrating an electric automobile equipped with a vehicle traction control apparatus according to Embodiment 1 of the present invention.

FIG. 1 is a configuration diagram illustrating an electric automobile equipped with a vehicle traction control apparatus according to Embodiment 1 of the present invention. In FIG. 1, an electric automobile 1 is provided with a front-left wheel 2FL and a front-right wheel 2FR that are driven wheels, a rear-left wheel 2RL and a rear-right wheel 2RR that are driving wheels, an electric motor 3 that outputs driving torque for driving the rear-left wheel 2RL and the rear-right wheel 2RR, hydraulic brakes 7FL and 7FR that brake the front-left wheel 2FL and the front-right wheel 2FR, respectively, an inverter 4 that supplies electric power to the electric motor 3, and an electronic control unit 5 that comprehensively controls the operation of the electric motor 3 and the inverter 4 so as to control driving torque for the left driving wheel 2RL and the right driving wheel 2RR. The electric automobile 1 may be not only a rear-wheel drive vehicle (FR vehicle) that outputs driving torque to the rear wheels, as illustrated in FIG. 1, but also a front-wheel drive vehicle (FF vehicle) that outputs driving torque to the front wheels.

The electric motor 3 is an AC motor and is driven by AC electric power outputted from the inverter 4. The driving torque outputted from the electric motor 3 is transmitted to the left driving wheel 2RL and the right driving wheel 2RR through a drive shaft 30 and a differential gear 40 so as to drive the electric automobile 1. The inverter 4 inverts DC electric power stored in an unillustrated high-voltage battery into AC electric power and supplies the AC electric power to the electric motor 3.

The electronic control unit 5 generates a target voltage for the inverter 4, based on a target driving torque to be determined through operation of accelerator by an unillustrated driver and the driving condition of the electric automobile 1. The electronic control unit 5 creates hydraulic commands for the driven wheel brakes 7FL and 7FR, based on the rotation speeds of the front-left wheel 2FL and the front-right wheel 2FR, which are driven wheels, the rotation speeds of the rear-left wheel 2RL and the rear-right wheel 2RR, which are driving wheels, and the driving conditions of the electric automobile 1 such as the amount of braking operation by the unillustrated driver and the like. Furthermore, although the illustration therefor will be omitted, the electronic control unit 5 includes a microprocessor that performs calculation, a ROM that stores programs for making the microprocessor implement various processing items, and a RAM that stores various kinds of data items such as calculation results and the like.

The electronic control unit 5 is connected with an encoder-type rear-left wheel rotation speed sensor 6RL and an encoder-type rear-right wheel rotation speed sensor 6RR that detect the wheel rotation speeds of the rear-left wheel 2RL and the rear-right wheel 2RR, respectively, which are driving wheels, and an encoder-type front-left wheel rotation speed sensor 6FL and an encoder-type front-right wheel rotation speed sensor 6FR that detect the wheel rotation speeds of the front-left wheel 2FL and the front-right wheel 2FR, respectively, which are driven wheels. The rear-left wheel rotation speed sensor 6RL, the rear-right wheel rotation speed sensor 6RR, the front-left wheel rotation speed sensor 6FL, and the front-right wheel rotation speed sensor 6FR are collectively referred to simply as "wheel rotation speed sensors".

Figure 2:
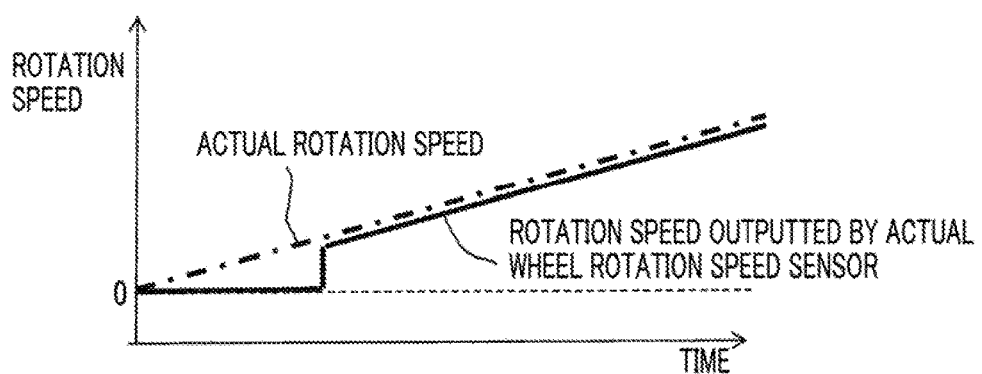
FIG. 2 is a waveform chart representing the waveform of a rotation speed outputted by a wheel speed sensor of the electric automobile illustrated in FIG. 1.

FIG. 2 is a waveform chart representing the waveform of a rotation speed outputted by each of the wheel rotation speed sensors 6RL, 6RR, 6FL, and 6FR of the electric automobile illustrated in FIG. 1; the ordinate denotes the rotation speed of a wheel, and the abscissa denotes the time. In FIG. 2, the chain line represents the actual rotation speed, and the solid line represents the rotation speed that is actually outputted by each of the encoder-type wheel rotation speed sensors 6RL, 6RR, 6FL, and 6FR; each of the wheel rotation speed sensors outputs "0" at a low vehicle speed of a predetermined rotation speed or lower. Therefore, at a low vehicle speed, there exists a difference between the actual rotation speed and the rotation speed actually outputted by the wheel rotation speed sensor. Accordingly, in the traction control apparatus disclosed in Patent Document 2, a virtual vehicle speed is created in a region where the output of the wheel rotation speed sensor is "0", and then traction control is performed by use of the created virtual vehicle speed.

Figure 3:
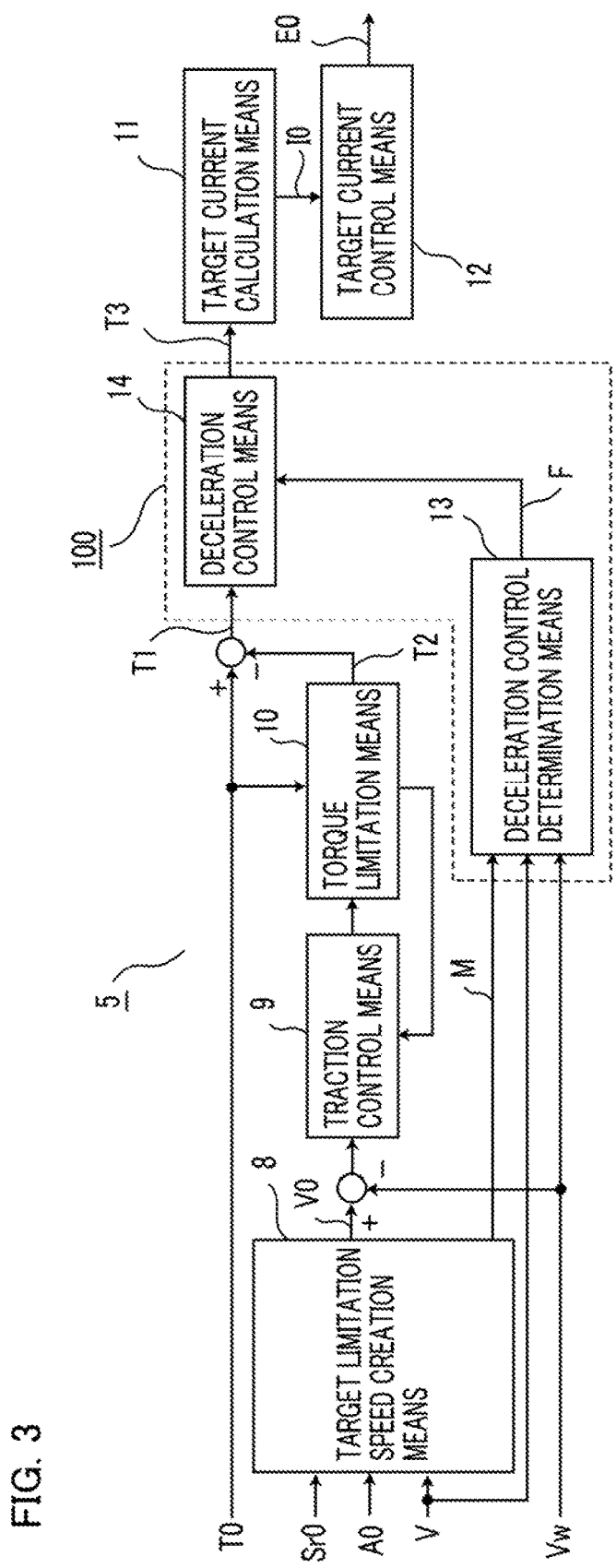
FIG. 3 is a block diagram illustrating an electronic control unit in the vehicle traction control apparatus according to Embodiment 1 of the present invention.

FIG. 3 is a block diagram illustrating an electronic control unit in the vehicle traction control apparatus according to Embodiment 1 of the present invention; the flow of creating a target voltage for the inverter 4 is also represented. In FIG. 3, a target limitation speed creation means 8 calculates a target limitation speed V0 and a control mode M, based on a target slip rate Sr0, a driven-wheel rotation speed V, and an acceleration signal A0. In Embodiment 1, a traction control means 9 utilizes PI (proportional integral) control. The control by the traction control means 9 may be configured in such a way that differential control and a filter are added to the PI (proportional integral) control.

A torque limitation means 10 corrects the integral term of the PI (proportional integral) control so that the output of the traction control means 9 approximately coincides with a torque limitation value of the torque limitation means 10. The torque limitation means 10 limits the value of a speed limitation torque T2 so that a target driving torque T0 does not have a sign opposite to that of a target driving torque T1. In other words, the torque limitation means 10 limits the absolute value of the speed limitation torque T2 to the absolute value of the target driving torque T0 or smaller so that the absolute value of the speed limitation torque T2 does not exceed the absolute value of the target driving torque T0.

After receiving the control mode M, the driven-wheel rotation speed V, and a driving-wheel rotation speed Vw, a deceleration control determination means 13 determines whether or not deceleration control should be implemented; in the case where deceleration control should be implemented, the deceleration control determination means 13 sets a deceleration control flag F to "1" or "2"; in the case where deceleration control should not be implemented, the deceleration control determination means 13 sets the deceleration control flag F to "0". Switching of the deceleration control flag between "1" and "2" is determined based on the charging rate (hereinafter, referred to as a SOC) of a battery that supplies electric power to the electric motor 3; in the case where the SOC is lower than a threshold value, the deceleration control determination means 13 outputs "1", as the deceleration control flag F; in the case where the SOC is higher than the threshold value, the deceleration control determination means 13 outputs "2", as the deceleration control flag F.

A deceleration control means 14 receives the deceleration control flag F; then, in the case where the deceleration control flag F is "1", the deceleration control means 14 outputs a final target driving torque T3 for performing control in which regenerative torque is outputted so as to decelerate the driving-wheel rotation speed Vw; in the case where the deceleration control flag F is "2", the deceleration control means 14 outputs the final target driving torque T3 for performing control in which three-phase short-circuiting is applied to the electric motor 3 so as to decelerate the driving-wheel rotation speed Vw. The deceleration control means 14 can also output the final target driving torque T3 for applying braking force to the driven wheels through a brake at a time when the deceleration control is performed so that the vehicle is prevented from slipping off downward on the surface of a road such as a slope having a low road-surface friction coefficient μ. The deceleration control determination means 13 and the deceleration control means 14 are included in a deceleration control unit 100 that characterizes Embodiment 1 of the present invention.

A target current calculation means 11 receives the final target driving torque T3 and then outputs a target current I0 to the electric motor 3. A target current control means 12 generates a target voltage E0, to the inverter 4, that keeps track of the target current I0 from the target current calculation means 11.

Figure 4:
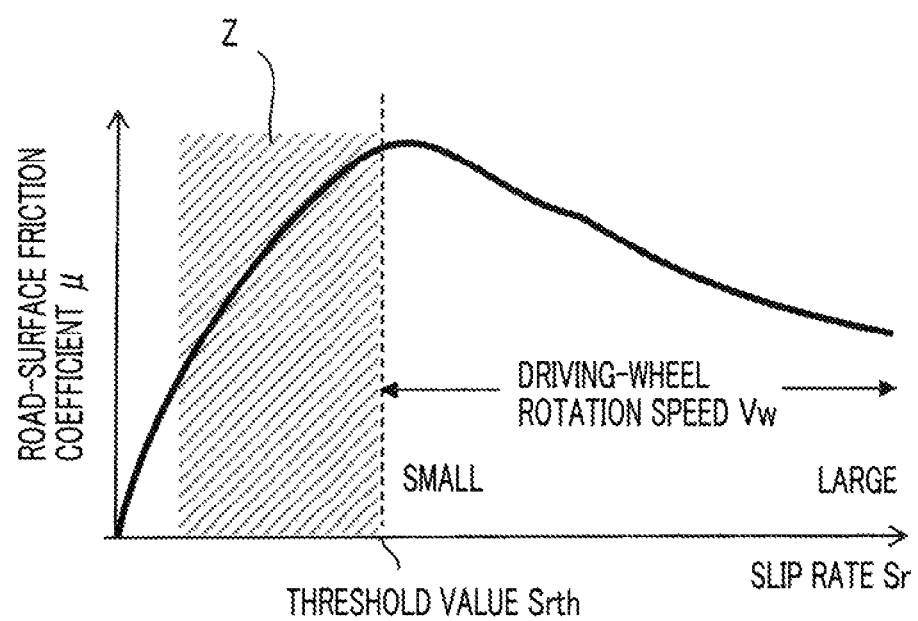
FIG. 4 is a characteristic chart representing the characteristic of the friction coefficient between a road surface and a driving wheel vs. the slip rate of the driving wheel, in the vehicle traction control apparatus according to Embodiment 1 of the present invention.

FIG. 4 is a characteristic chart representing the characteristic of the road-surface friction coefficient μ vs. the driving-wheel slip rate Sr, in the vehicle traction control apparatus according to Embodiment 1 of the present invention; the ordinate denotes the road-surface friction coefficient μ, and the abscissa denotes the slip rate Sr. In FIG. 4, firstly, the slip rate Sr is a value expressed by the equation (1) below.

$$Sr=(Vw-V)\div Vw \quad (1)$$

where Sr, Vw, and V are the slip rate, the driving-wheel rotation speed, and the driven-wheel rotation speed, respectively.

When as the first example, the driving-wheel rotation speed Vw is 6000 [rpm] and the driven-wheel rotation speed V is 4000 [rpm], the slip rate Sr is "0.33". When as the second example, the driving-wheel rotation speed Vw is 7000 [rpm] and the driven-wheel rotation speed V is 4000 [rpm], as is the case as the first example, the slip rate Sr is "0.43"; thus, the degree of slipping in the second example is larger than that in the first example.

In FIG. 4, the region Z represented by oblique lines is a controllable region in the traction control, where the road-surface friction coefficient μ monotonically increases as the slip rate Sr increases. When the driving-wheel rotation speed Vw becomes "large (high)" and the slip rate Sr becomes high, the characteristic of the traction control becomes out of the controllable region Z and hence the accuracy of the traction control is deteriorated. A slip rate threshold value Srth in FIG. 4 is set at the boundary between the controllable region and the uncontrollable region and is obtained through an experiment or the like. Embodiment 1 of the present invention is characterized in that when the slip rate Sr becomes so large as to reach the uncontrollable region out of the controllable region represented in FIG. 4, the driving-wheel rotation speed Vw is decelerated so as to be in the controllable region Z and hence the slip rate Sr falls to the threshold value Srth or smaller.

Figure 5:
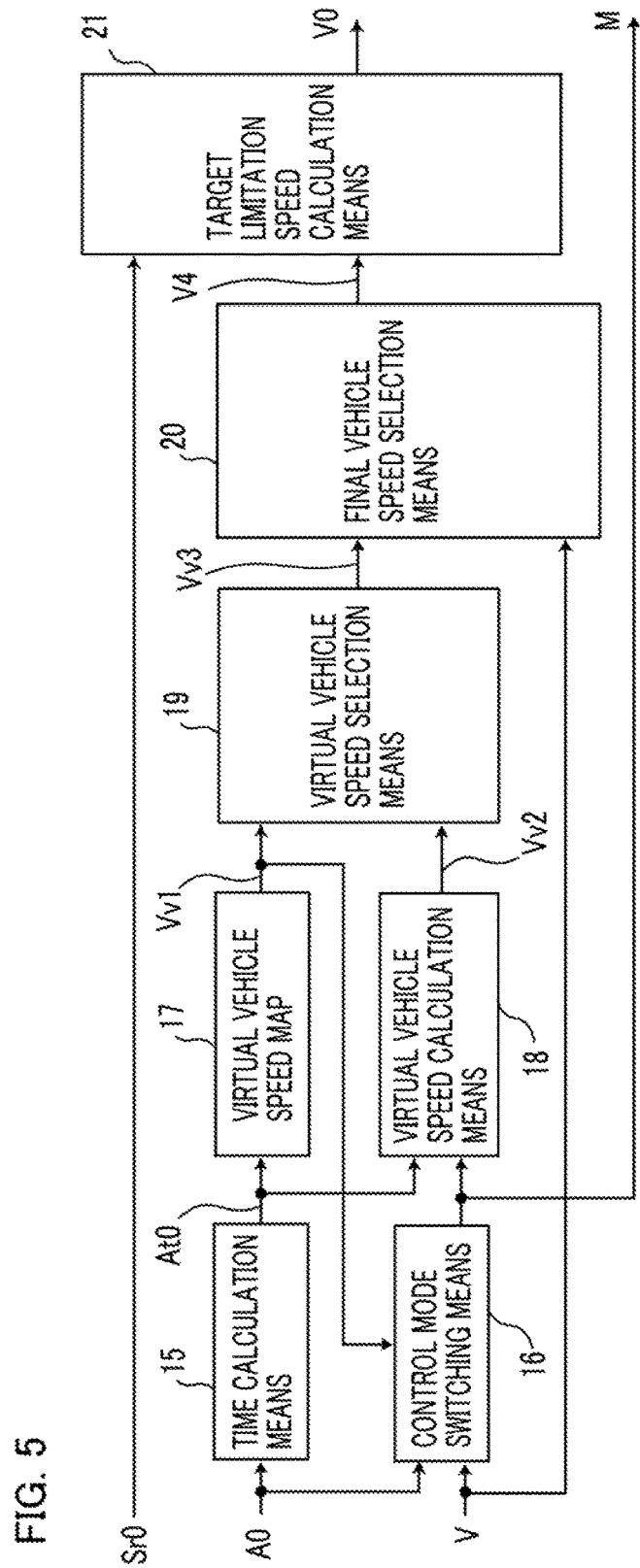
FIG. 5 is a block diagram illustrating a target limitation speed creation means in the vehicle traction control apparatus according to Embodiment 1 of the present invention.

FIG. 5 is a block diagram illustrating the target limitation speed creation means in the vehicle traction control apparatus according to Embodiment 1 of the present invention;

FIG. 5 represents the configuration of the target limitation speed creation means 8 in FIG. 3, described above. In FIG. 5, when the acceleration signal A0 exceeds a predetermined threshold value, a time calculation means 15 determines that the acceleration signal A0 is on, and calculates an accelerator-on time At0. In the case where the acceleration signal A0 becomes smaller than the predetermined threshold value or in the case where a reset signal is inputted, the accelerator-on time At0 is reset to "0".

A control mode switching means 16 has a means for switching the control modes M by use of the acceleration signal A0, the driven-wheel rotation speed V, and a first virtual vehicle speed Vv1 from a virtual vehicle speed map 17. The details thereof will be explained with reference to the flowchart represented in FIG. 6, described later. By use of the accelerator-on time At0 from the time calculation means 15, the virtual vehicle speed map 17 outputs the first virtual vehicle speed Vv1 from a row of numerical values, each of which is preliminarily set as the output corresponding to the accelerator-on time At0. The details thereof will be explained with reference to FIG. 7, described later.

A virtual vehicle speed calculation means 18 obtains a virtual acceleration corresponding to the present control mode from a virtual acceleration map in which a row of virtual-acceleration numerical values, each of which corresponds to the control mode from the control mode switching means 16, is set, and then calculates a second virtual vehicle speed Vv2. The details thereof will be explained with reference to FIG. 7, described later. A virtual vehicle speed selection means 19 compares the first virtual vehicle speed Vv1 with the second virtual vehicle speed Vv2 and outputs, as a final virtual vehicle speed Vv3, one, of the first virtual vehicle speed Vv1 and the second virtual vehicle speed Vv2, that is larger than the other one in terms of the absolute values thereof. The details thereof will be explained with reference to FIG. 7, described later.

A final vehicle speed selection means 20 utilizes the final virtual vehicle speed Vv3 when the driven-wheel rotation speed V is "0", and outputs, as a final vehicle speed V4, the driven-wheel rotation speed V when the driven-wheel rotation speed V is larger than "0". The details thereof will be explained with reference to FIG. 8, described later. Based on the final vehicle speed V4 and the target slip rate Sr0, a target limitation speed calculation means 21 calculates the target limitation speed V0, by use of the equation (2) below.

$$V0 = V4 + V4 \times Sr0 \div (1-Sr0) \quad (2)$$

where V0, V4, and Sr0 are the target limitation speed, the final vehicle speed, and the target slip rate, respectively.

Figure 6:
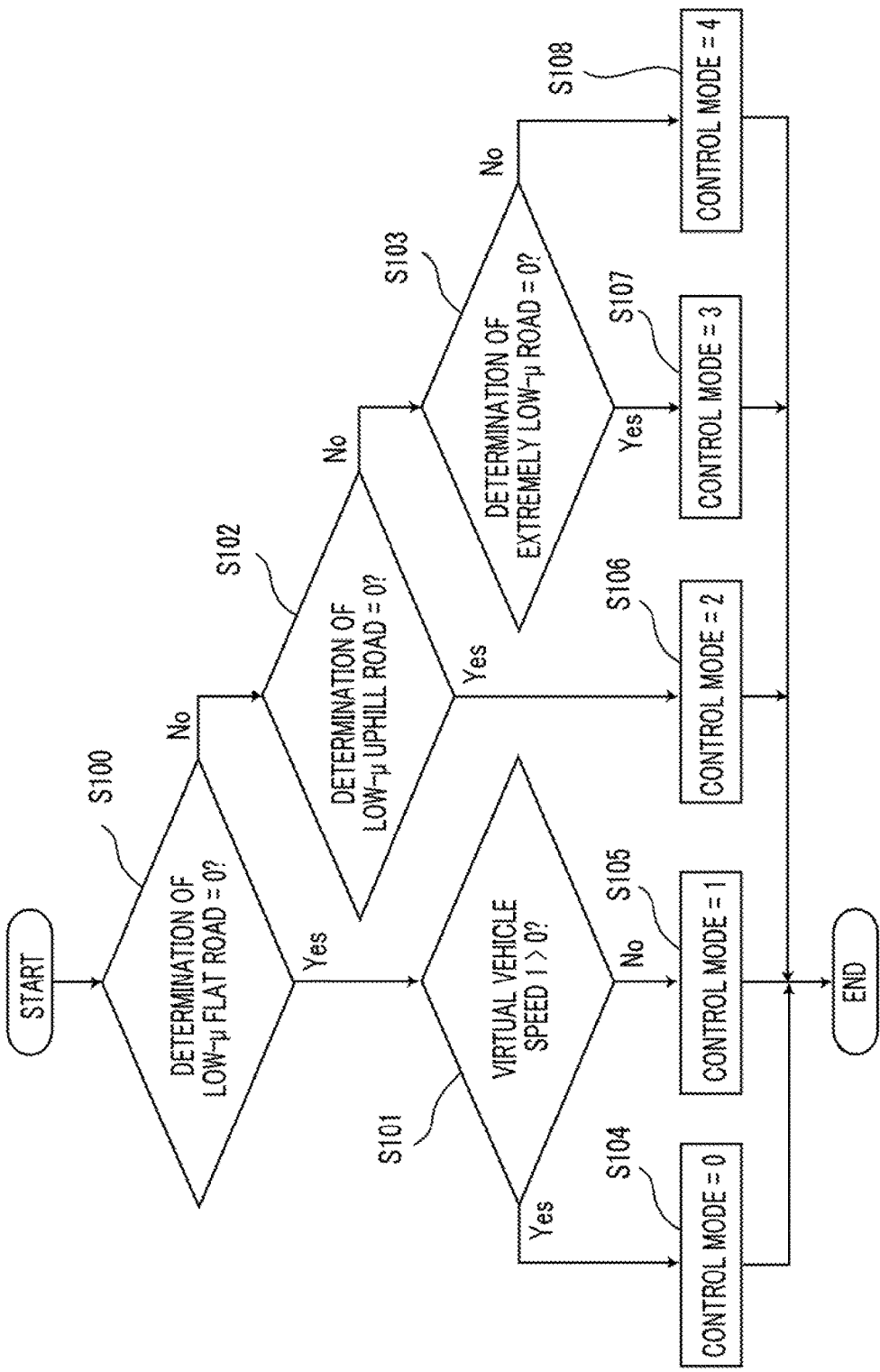
FIG. 6 is a flowchart representing the operation of a control mode switching means in the vehicle traction control apparatus according to Embodiment 1 of the present invention.

FIG. 6 is a flowchart representing the operation of the control mode switching means in the vehicle traction control apparatus according to Embodiment 1 of the present invention; FIG. 6 represents the operation of the control mode switching means 16 in FIG. 5, described above. In Embodiment 1, as an example, the control modes M are classified into four road-surface conditions, i.e., a road surface of a high road-surface friction coefficient μ, a road surface that is a flat road and has a low road-surface friction coefficient μ, a road surface that is an uphill road and has a low road-surface friction coefficient μ, and a road surface of an extremely low road-surface friction coefficient μ.

In this situation, the control mode M of the road surface of a high road-surface friction coefficient μ is set to "0" or "1"; the control mode M of the road surface that is a flat road and has a low road-surface friction coefficient μ is set to "2"; the control mode M of the road surface that is an uphill road and has a low road-surface friction coefficient μ is set to "3"; the control mode M of the road surface of an extremely low road-surface friction coefficient μ is set to "4". In addition, when finer control is desired, the number of control modes and the kinds of the determination processing items therefor may be increased.

The control mode M outputted from the control mode switching means 16 is inputted to the virtual vehicle speed calculation means 18 in FIG. 5, and then a second virtual acceleration Vel corresponding to the control mode M is set; the setting value of the second virtual acceleration Vel in Embodiment 1 is set as follows:

Vel corresponding to the control mode "0" or "1">Vel corresponding to the control mode "2">Vel corresponding to the control mode "3">Vel corresponding to the control mode "4"

The setting in such a manner suggests that the hike of the speed in the speed region where the wheel rotation speed is low is suppressed more as the road surface is more slippery. In general, it is known that the friction coefficient between a road surface and a tire decreases more as the relative speed difference between the wheel rotation speed and the tire rotation speed is larger; when the road surface is slippery, the hike of the speed is suppressed, so that the friction coefficient between the road surface and the tire can be prevented from excessively decreasing.

Next, the operation of the control mode switching means 16 will be explained based on FIG. 6. In FIG. 6, in the step S100, it is determined whether or not the road-surface condition is a road surface that is a flat road and has a low road-surface friction coefficient μ. In this determination, the determination result that the road-surface condition is a road surface that is a flat road and has a low road-surface friction coefficient μ is set to "1"; the determination result that the road-surface condition is not a road surface that is a flat road and has a low road-surface friction coefficient μ is set to "0". In the determination in the step S100, when the determination result is "No", the step S100 is followed by the step S102, where it is determined whether or not the road-surface condition is a road surface that is an uphill road and has a low road-surface friction coefficient μ. In this determination, the determination result that the road-surface condition is a road surface that is an uphill road and has a low road-surface friction coefficient μ is set to "1"; the determination result that the road-surface condition is not a road surface that is an uphill road and has a low road-surface friction coefficient μ is set to "0".

In the determination in the step S102, when the determination result is "No", the step S102 is followed by the step S103, where it is determined whether or not the road-surface condition is a road surface of an extremely low road-surface friction coefficient μ. In this determination, the determination result that the road-surface condition is a road surface of an extremely low road-surface friction coefficient μ is set to "1"; the determination result that the road-surface condition is not a road surface of an extremely low road-surface friction coefficient μ is set to "0".

In the determination in the step S100, when the determination result is "Yes", the step S100 is followed by the step S101, where it is determined whether or not the present timing is immediately after an accelerator-on timing and the first virtual vehicle speed Vv1 is larger than "0"; in the case where the first virtual vehicle speed Vv1 is larger than "0", the step S101 is followed by the step S104, where the control mode M is set to "0". In the determination in the step S101, in the case where it is determined that the first virtual vehicle speed Vv1 is not larger than "0", the step S101 is followed by the step S105, where the control mode M is set to "1".

In the determination in the step S102, in the case where the determination result is "Yes", the step S102 is followed by the step S106, where the control mode M is set to "2". In the determination in the step S103, in the case where the determination result is "Yes", the step S103 is followed by the step S107, where the control mode M is set to "3". In the determination in the step S103, in the case where the determination result is "No", the step S103 is followed by the step S108, where the control mode M is set to "4".

Figure 7A:
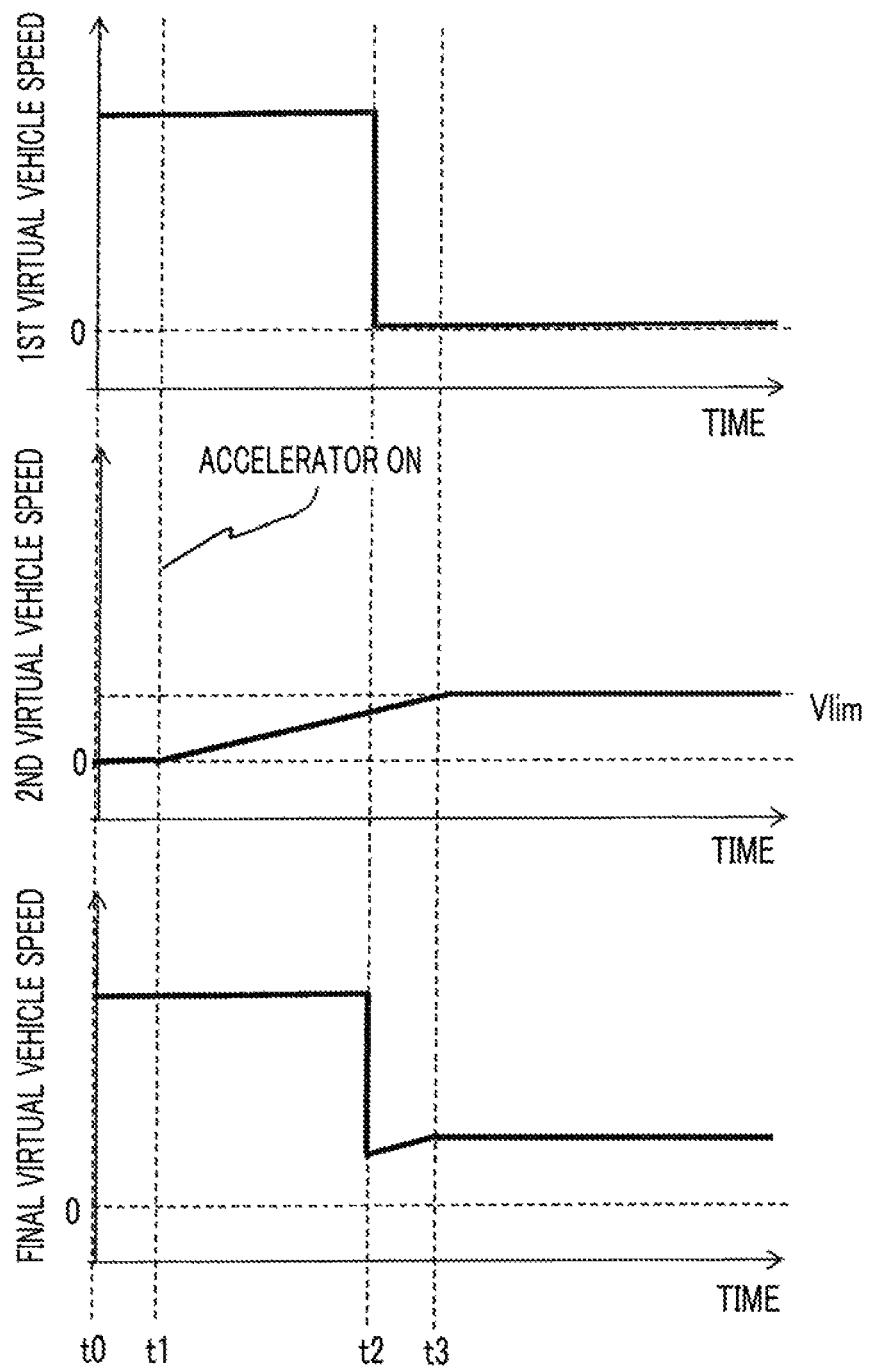
FIG. 7A is an explanatory chart representing the operation of the vehicle traction control apparatus according to Embodiment 1 of the present invention.

FIG. 7A is an explanatory chart representing the operation of the vehicle traction control apparatus according to Embodiment 1 of the present invention; FIG. 7A represents the respective temporal transitions of the first virtual vehicle speed Vv1 outputted from the virtual vehicle speed map 17, the second virtual vehicle speed Vv2 calculated by the virtual vehicle speed calculation means 18, and the final virtual vehicle speed Vv3 that is selected by the virtual vehicle speed selection means 19 through comparison between the first virtual vehicle speed Vv1 and the second virtual vehicle speed Vv2. Next, the first virtual vehicle speed Vv1, the second virtual vehicle speed Vv2, and the final virtual vehicle speed Vv3 will be explained based on an example at a timing immediately after the accelerator-on timing.

(1) The First Virtual Vehicle Speed Vv1

In order to prevent the traction control from reducing torque at a timing immediately after the accelerator-on timing, the virtual vehicle speed map 17 outputs a high vehicle speed. Specifically, by use of an accelerator-on time from the time calculation means 15, the virtual vehicle speed map 17 outputs the first virtual vehicle speed Vv1 from a row of numerical values, each of which is preliminarily set, as the output corresponding to the accelerator-on time. In FIG. 7A, the accelerator is pressed down at the time t1; in the interval between the time t0 and the time t2, the first virtual vehicle speed Vv1 calculated from the virtual vehicle speed map is outputted before the accelerator-on time and for a predetermined time after the accelerator-on time. The time t2 is the instant when the first virtual vehicle speed Vv1 becomes "0" after the predetermined time has elapsed from the accelerator-on timing. In the interval between the time t2 and the time t3, the first virtual vehicle speed Vv1 is "0".

(2) The Second Virtual Vehicle Speed Vv2

Figure 7B:
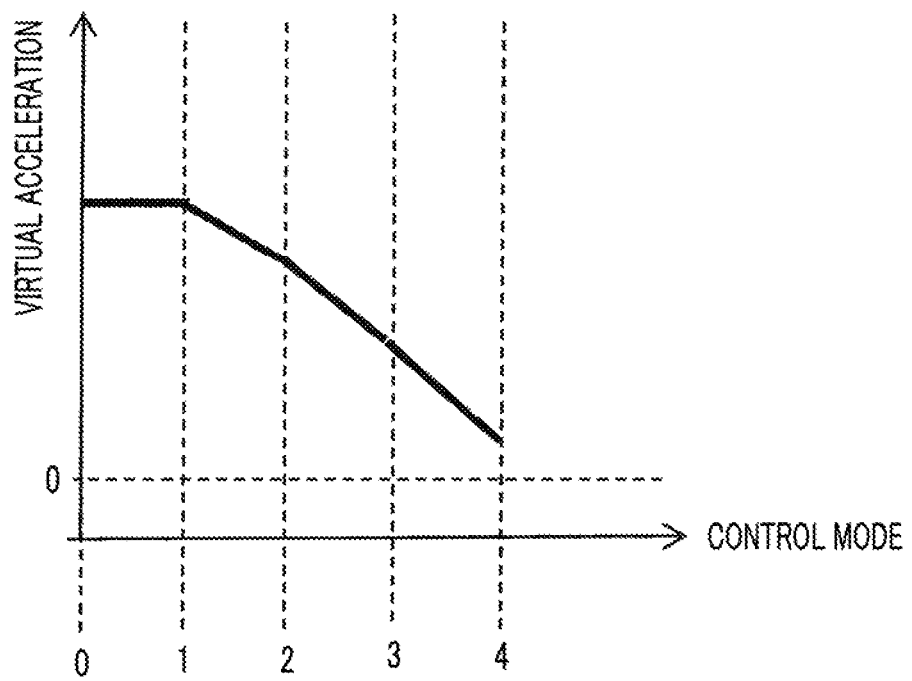
FIG. 7B is an explanatory chart representing the relationship between the virtual acceleration vs. the control mode, in the vehicle traction control apparatus according to Embodiment 1 of the present invention.

The virtual vehicle speed calculation means 18 obtains a virtual acceleration Vel, represented in FIG. 7B, corresponding to the present control mode M from a virtual acceleration map in which a row of virtual-acceleration numerical values, each of which corresponds to the control mode M from the control mode switching means 16, is set, and then calculates the second virtual vehicle speed Vv2 by use of the equation (3) below. FIG. 7B is an explanatory chart representing the relationship between the virtual acceleration vs. the control mode, in the vehicle traction control apparatus according to Embodiment 1 of the present invention; the virtual acceleration Vel decreases as the control mode becomes "0", "1", "2", "3", and "4", in that order.

$$Vv2 = Vel \times \text{accelerator-on time} \quad (3)$$

where Vv2 and Vel are the second virtual vehicle speed and the virtual acceleration, respectively.

Clipping processing is applied to the second virtual vehicle speed Vv2 so that the second virtual vehicle speed Vv2 does not increase so much as to exceed a predetermined speed Vlim. In the interval between the time t0 and the time t1, the second virtual vehicle speed Vv2 is "0". The time t1 is the instant when the accelerator is pressed down. In the interval between the time t1 and the time t3 after the accelerator-on timing, the second virtual vehicle speed Vv2 is calculated by use of the virtual acceleration Vel corresponding to the control mode M. The time t3 is the instant when clipping processing with the predetermined speed Vlim is applied to the second virtual vehicle speed Vv2. The predetermined speed Vlim is made to coincide with a vehicle speed outputted by a wheel rotation speed sensor, for the driven wheel, that will be explained with reference to FIG. 8, described later. After the time t3, the predetermined speed Vlim with which the clipping processing has been implemented is outputted.

(3) The Final Virtual Vehicle Speed Vv3

A virtual vehicle speed selection means 19 sequentially compares the first virtual vehicle speed Vv1 with the second virtual vehicle speed Vv2 and utilizes, as the final virtual vehicle speed Vv3, one, of the first virtual vehicle speed Vv1 and the second virtual vehicle speed Vv2, that is larger than the other one in terms of the absolute values thereof. That is to say, $$Vv3 = \text{MAX}(Vv1, Vv2)$$

where Vv3, Vv1, and Vv2 are the final virtual vehicle speed, the first virtual vehicle speed, and the second virtual vehicle speed, respectively.

In the interval between the time t0 and the time t2, the first virtual vehicle speed Vv1 is larger than the second virtual vehicle speed Vv2; thus, the virtual vehicle speed selection means 19 selects the first virtual vehicle speed Vv1, as the final virtual vehicle speed Vv3. After the time t2, the second virtual vehicle speed Vv2 is larger than the first virtual vehicle speed Vv1; thus, the virtual vehicle speed selection means 19 selects the second virtual vehicle speed Vv2, as the final virtual vehicle speed Vv3.

FIG. 8 is an explanatory chart representing the operation of the vehicle traction control apparatus according to Embodiment 1 of the present invention; FIG. 8 represents the final virtual vehicle speed Vv3, the driven-wheel rotation speed V, and the final vehicle speed V4. That is to say, FIG. 8 represents the respective temporal transitions of the final virtual vehicle speed Vv3, the driven-wheel rotation speed V, and the final vehicle speed V. Next, taking, as an example, the timing immediately after the accelerator-on timing, there will be explained, based on FIG. 8, the final virtual vehicle speed Vv3 selected by the virtual vehicle speed selection means 19, the actual driven-wheel rotation speed and the rotation speed outputted by an actual wheel rotation speed sensor, and the final vehicle speed V4 that is selected by the final vehicle speed selection means 20 through comparison between the two rotation speeds. In Embodiment 1, the foregoing rotation speed and speed are equivalent to each other.

(1) The Final Virtual Vehicle Speed Vv3

As explained with reference to FIG. 7, described above, the virtual vehicle speed selection means 19 sequentially compares the first virtual vehicle speed Vv1 with the second virtual vehicle speed Vv2 and utilizes, as the final virtual vehicle speed Vv3, one, of the first virtual vehicle speed Vv1 and the second virtual vehicle speed Vv2, that is larger than the other one in terms of the absolute values thereof. In FIG. 8, in the interval between the time t0 and the time t2, the first virtual vehicle speed Vv1 is larger than the second virtual vehicle speed Vv2; thus, the virtual vehicle speed selection means 19 selects the first virtual vehicle speed Vv1, as the final virtual vehicle speed Vv3. After the time t2, the second virtual vehicle speed Vv2 is larger than the first virtual vehicle speed Vv1; thus, the virtual vehicle speed selection means 19 selects the second virtual vehicle speed Vv2, as the final virtual vehicle speed Vv3.

(2) The Driven-Wheel Rotation Speed V

In FIG. 8, the chain line represents the actual driven-wheel rotation speed, and the solid line represents the rotation speed that is actually outputted by each of the encoder-type wheel rotation speed sensors 6FL and 6FR. In the interval between the time t0 and the time t1, the accelerator has not been pressed down and both the two foregoing rotation speeds are "0". Next, the time t1 is the instant when the accelerator is pressed down. In the interval between the time t1 and the time t4, the actual driven-wheel rotation speed becomes larger as the accelerator-on time increases. However, the rotation speed outputted by the actual wheel rotation speed sensor is "0". The time t4 is the instant when the rotation speed outputted by the actual wheel rotation speed sensor becomes larger than "0". After the time t4, the rotation speed outputted by the actual wheel rotation speed sensor becomes larger as the accelerator-on time increases.

(3) The Final Vehicle Speed V4

The final vehicle speed selection means 20 utilizes the final virtual vehicle speed Vv3, as the final vehicle speed V4, when the driven-wheel rotation speed is "0", and utilizes a wheel rotation speed based on an actual rotation speed, as the final vehicle speed V4, when the driven-wheel rotation speed is larger than "0". In the interval between the time t0 and the time t4, the rotation speed outputted by the actual wheel rotation speed sensor is "0", and the final virtual vehicle speed Vv3 is utilized as the final vehicle speed V4. In the interval after the time t4, the rotation speed outputted by the actual wheel rotation speed sensor is larger than "0" and is utilized as the final vehicle speed V4.

FIG. 9 is a flowchart representing the operation of the deceleration control determination means in the vehicle traction control apparatus according to Embodiment 1 of the present invention; FIG. 9 represents the operation of the deceleration control determination means 13 in FIG. 3. In FIG. 9, in the step S500, as the first operation after a low-voltage power source of the vehicle is turned on, the deceleration control flag F is initialized to "0". In the step S501, it is determined whether or not the deceleration control flag F is not "0"; in the case where the deceleration control flag F is "1" or "2" (Yes), the step S501 is followed by the step S503; in the case where the deceleration control flag F is "0" (No), the step S501 is followed by the step S502. In the step S502, a trigger is generated at the instant when the control modes M are switched; in the case where the trigger is detected, the result of the determination becomes "Yes".

After the result of the determination in the step S502 becomes "Yes" and hence the step S502 is followed by the step S503, it is determined whether or not the driving-wheel rotation speed is larger than a threshold value V1; in the case where the driving-wheel rotation speed is larger than the threshold value V1 (Yes), the step S503 is followed by the step S504; in the case where the driving-wheel rotation speed is smaller than the threshold value V1 (No), the step S503 is followed by the step S506. The threshold value V1 of the rotation speed is a driving-wheel rotation speed upper limit value for the characteristic of the traction control to fall into the controllable region Z, of the traction control, that is obtained through an experiment or the like and represented in FIG. 4. In the step S504, it is determined whether or not the driven-wheel rotation speed V is "0"; in the case where the driven-wheel rotation speed V is "0" (Yes), the step S504 is followed by the step S505; in the case where the driven-wheel rotation speed V is not "0" (No), the step S504 is followed by the step S506. The determination whether or not the driven-wheel rotation speed V is "0" may be implemented by determining whether or not the absolute value of the driven-wheel rotation speed V is the same as or lower than the threshold value V1.

In the step S505, it is determined whether or not the SOC is larger than a threshold value S1; in the case where the SOC is larger than the threshold value S1 (Yes), the step S505 is followed by the step S508; in the case where the SOC is smaller than the threshold value S1 (No), the step S505 is followed by the step S507. The threshold value S1 is set to a value with which an actual SOC is prevented from exceeding a target SOC due to charging through regenerative torque in the step S507, described later; as the threshold value S1, a value obtained through an experiment of the like is utilized. In Embodiment 1, as the determination criterion for the battery condition, the SOC is utilized; however, instead of the SOC, the voltage of the battery may be utilized as the determination criterion.

In the step S506, the deceleration control flag F is set to "0"; then, the deceleration control determination processing is ended. In the step S507, the deceleration control flag F is set to "1" so that deceleration control is implemented through regenerative torque; then, the deceleration control determination processing is ended. In the step S508, the deceleration control flag F is set to "2" so that deceleration control is implemented through three-phase short-circuiting of the electric motor 3; then, the deceleration control determination processing is ended.

Here, in order to make a comparison with the vehicle traction control apparatus according to Embodiment 1 of the present application, the operation of the traction control apparatus proposed in Patent Document 2, described above, will be explained. FIG. 10 is an explanatory chart for explaining the operation of the conventional apparatus; FIG. 10 represents the respective temporal transitions of the torque, the SOC, the driving-wheel rotation speed, the driven-wheel rotation speed, and the control mode. In FIG. 10, in the interval between the time t0 and the time t4, the first virtual vehicle speed to be calculated through a virtual vehicle speed map is outputted for a predetermined time after the accelerator has been pressed down. In the interval between the time t0 and the time t1, the accelerator has not been pressed down and both the respective actual rotation speeds, represented by chain lines, of the driving-wheel and the driven-wheel are "0". The time t1 is the instant when the accelerator is pressed down.

In the interval between the time t1 and the time t2, because after the accelerator has been pressed down, the torque increases, both the respective actual rotation speeds of the driving-wheel and the driven-wheel becomes larger. The time t2 is the instant when the driving-wheel rotation speed exceeds a threshold value V0 for performing determination whether or not the present road surface is a road surface that is a flat road and has a low road-surface friction coefficient μ; from this instant, the determination whether or not the present road surface is a road surface that is a flat road and has a low road-surface friction coefficient μ is implemented. As the threshold value V0, there is utilized a driving-wheel rotation speed upon slipping obtained through an experiment or the like on the road surface that is a flat road and has a low road-surface friction coefficient μ.

In the interval between the time t2 and the time t3, the condition that the driving-wheel rotation speed is larger than the threshold value V0 and the driven-wheel rotation speed is "0" continues; in this interval, the determination whether or not the present road surface is a road surface that is a flat road and has a low road-surface friction coefficient μ is implemented. The time t3 is the instant when the condition that the driving-wheel rotation speed is larger than the threshold value V0 and the driven-wheel rotation speed is "0" has elapsed for a predetermined time; it is determined that the present road surface is a road surface that is a flat road and has a low road-surface friction coefficient μ, and then the determination result is set to "1".

In the interval between the time t3 and the time t4, the traction control is performed based on the target limitation speed. The time t4 is the instant when the first virtual vehicle speed becomes "0" after a predetermined time has elapsed from an accelerator-on timing. In the interval between the time t4 and the time t5, the traction control is performed based on a target limitation speed calculated from the second virtual vehicle speed; in this interval, because the driving-wheel rotation speed is high, the slip rate is also high. Moreover, because the slip rate is high, the traction control falls out of the uncontrollable region thereof; thus, the tracking capability of the actual driving-wheel rotation speed for the target limitation speed is not high. The time t5 is the instant when clipping processing with the upper limit value Vlim is applied to the second virtual vehicle speed.

In the interval after the time t5, the traction control is performed based on the target limitation speed with which the clipping processing has been implemented. However, because the slip rate is high and the traction control falls out of the uncontrollable region thereof, the tracking capability of the driving-wheel rotation speed for the target limitation speed is not high. Moreover, because the condition that the slip rate is high continues, the situation that the vehicle does not start continues; thus, the operation becomes out of the intention of the driver. Furthermore, on a road surface such as a slope of a low friction coefficient μ, this situation may cause the vehicle to slip off downward.

Figure 11:
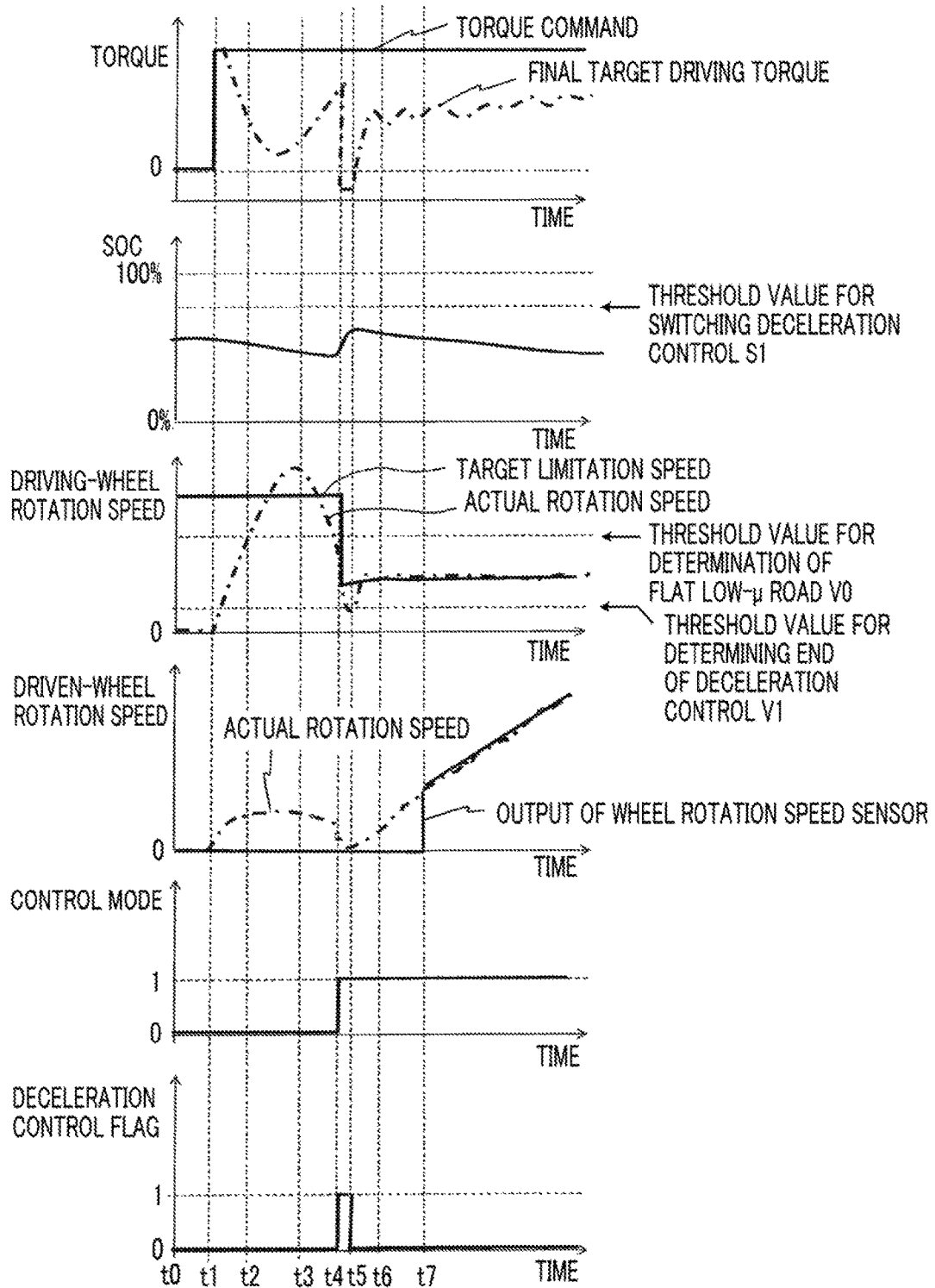
FIG. 11 is an explanatory chart for explaining the operation of the vehicle traction control apparatus according to Embodiment 1 of the present invention.

FIG. 11 is an explanatory chart for explaining the operation of the vehicle traction control apparatus according to Embodiment 1 of the present invention; FIG. 11 represents the respective temporal transitions of the torque, the SOC, the driving-wheel rotation speed, the driven-wheel rotation speed, the control mode, and the deceleration control flag at a time when under the condition that the SOC is lower than a threshold value, the driving-wheel rotation speed is reduced by use of the regenerative torque. In FIG. 11, in the interval between the time t0 and the time t4, the first virtual vehicle speed Vv1 to be calculated through the virtual vehicle speed map is outputted for a predetermined time after the accelerator has been pressed down. In the interval between the time t0 and the time t1, the accelerator has not been pressed down and both the respective actual rotation speeds of the driving-wheel and the driven-wheel are "0".

The time t1 is the instant when the accelerator is pressed down. In the interval between the time t1 and the time t2, because after the accelerator has been pressed down, the torque increases, both the respective actual rotation speeds of the driving-wheel and the driven-wheel becomes larger. The time t2 is the instant when the driving-wheel rotation speed exceeds a threshold value V0 for performing determination whether or not the present road surface is a road surface that is a flat road and has a low road-surface friction coefficient μ; from this instant, the determination whether or not the present road surface is a road surface that is a flat road and has a low road-surface friction coefficient μ is implemented. In the interval between the time t2 and the time t3, the condition that the driving-wheel rotation speed is larger than the threshold value V0 and the driven-wheel rotation speed is "0" continues; in this interval, the determination whether or not the present road surface is a road surface that is a flat road and has a low road-surface friction coefficient μ is implemented.

The time t3 is the instant when the condition that the driving-wheel rotation speed is larger than the threshold value V0 and the driven-wheel rotation speed is "0" has elapsed for a predetermined time; it is determined that the present road surface is a road surface that is a flat road and has a low road-surface friction coefficient μ, and then the determination result is set to "1". In the interval between the time t3 and the time t4, the traction control is performed based on the target limitation speed. The time t4 is the instant when the first virtual vehicle speed becomes "0" after a predetermined time has elapsed from an accelerator-on timing; the control mode is switched from "0" to "1". At this instant, impletion of deceleration control is determined. At this instant, it is determined whether or not the SOC is larger than the threshold value S1; then, because the determination provides the result that the SOC is smaller than the threshold value S1, the deceleration control flag of "1" is outputted.

In the interval between the time t4 and the time t5, the deceleration control means 14 receives the deceleration control flag of "1", outputs the regenerative torque, reduces the driving-wheel rotation speed, and then decreases the slip rate to a value with which the traction control falls into the controllable region thereof. Moreover, because the regeneration occurs, the SOC increases and hence insufficient charging is eliminated. The time t5 is the instant when the driving-wheel rotation speed becomes lower than the threshold value V1; the deceleration control flag becomes "0". Because the deceleration control is stopped, the traction control is switched to normal traction control utilizing a target limitation speed calculated from the final virtual vehicle speed. In the interval between the time t5 and the time t6, the traction control is implemented. The time t6 is the instant when clipping processing with the upper limit value Vlim is applied to the second virtual vehicle speed. In the interval between the time t6 and the time t7, the clipping processing with the upper limit value Vlim is being applied to the second virtual vehicle speed. The time t7 is the instant when the output of the actual wheel rotation speed sensor becomes larger than "0" and hence the final vehicle speeds are switched. In the interval after the time t7, the traction control is performed based on the target limitation speed.

Embodiment 2

Figure 12:
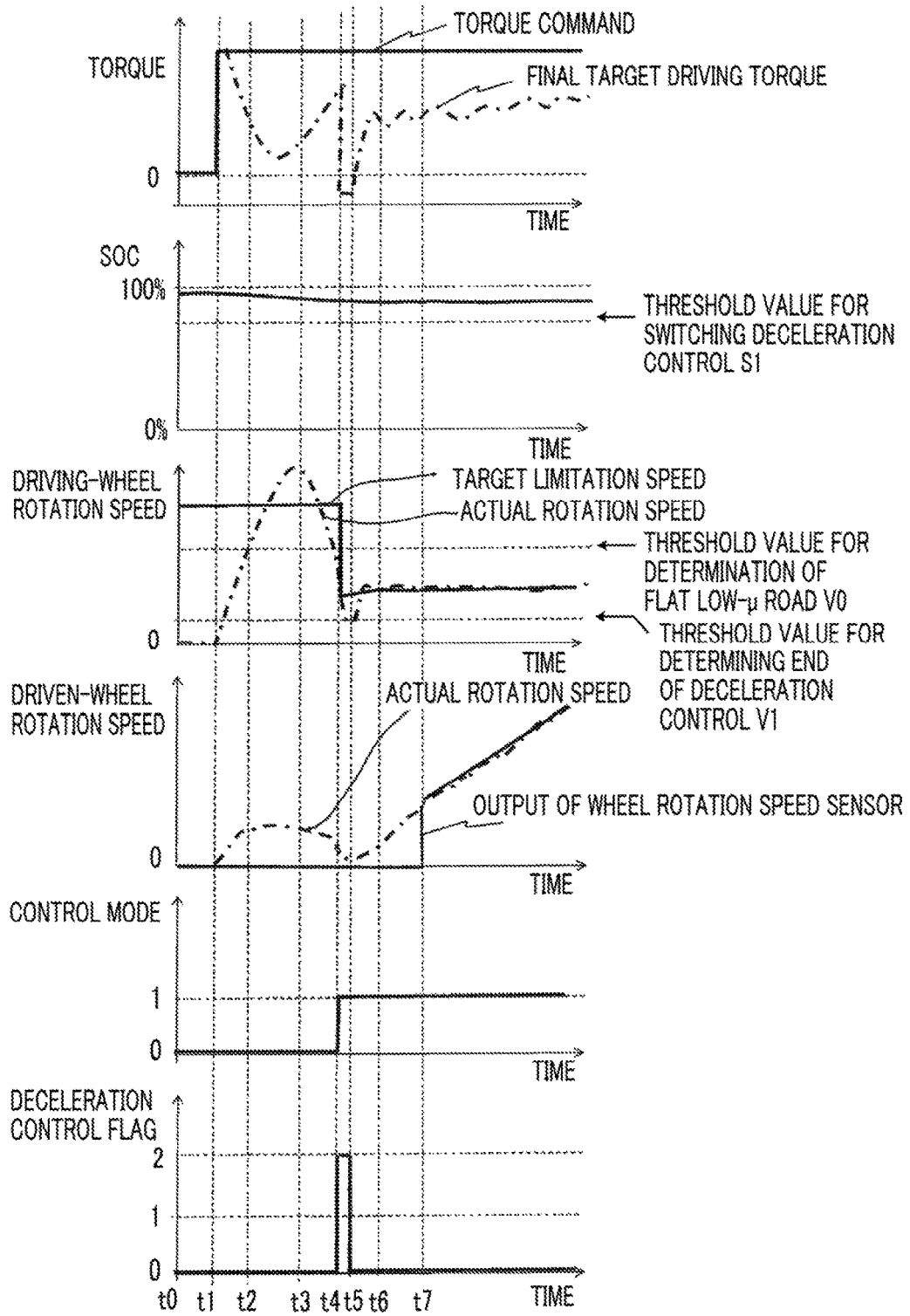
FIG. 12 is an explanatory chart for explaining the operation of a vehicle traction control apparatus according to Embodiment 2 of the present invention.

FIG. 12 is an explanatory chart for explaining the operation of a vehicle traction control apparatus according to Embodiment 2 of the present invention; FIG. 12 represents the respective temporal transitions of the torque, the SOC, the driving-wheel rotation speed, the driven-wheel rotation speed, the control mode, and the deceleration control flag at a time when under the condition that the SOC is higher than a threshold value, the driving-wheel rotation speed is reduced through three-phase short-circuiting of the electric motor. In the following explanation, the difference from Embodiment 1 will mainly be explained. In FIG. 12, in the interval between the time t0 and the time t4, the first virtual vehicle speed to be calculated through a virtual vehicle speed map is outputted for a predetermined time after the accelerator has been pressed down. In the interval between the time t0 and the time t1, the accelerator has not been pressed down and both the respective actual rotation speeds of the driving-wheel and the driven-wheel are "0". The time t1 is the instant when the accelerator is pressed down.

In the interval between the time t1 and the time t2, because after the accelerator has been pressed down, the torque increases, both the respective actual rotation speeds of the driving-wheel and the driven-wheel becomes larger. The time t2 is the instant when the driving-wheel rotation speed exceeds a threshold value V0 for performing determination whether or not the present road surface is a road surface that is a flat road and has a low road-surface friction coefficient μ; from this instant, the determination whether or not the present road surface is a road surface that is a flat road and has a low road-surface friction coefficient μ is implemented. In the interval between the time t2 and the time t3, the condition that the driving-wheel rotation speed is larger than the threshold value V0 and the driven-wheel rotation speed is "0" continues; in this interval, the determination whether or not the present road surface is a road surface that is a flat road and has a low road-surface friction coefficient μ is implemented.

The time t3 is the instant when the condition that the driving-wheel rotation speed is larger than the threshold value V0 and the driven-wheel rotation speed is "0" has elapsed for a predetermined time; it is determined that the present road surface is a road surface that is a flat road and has a low road-surface friction coefficient μ, and then the determination result is set to "1". In the interval between the time t3 and the time t4, the traction control is performed based on the target limitation speed. The time t4 is the instant when the first virtual vehicle speed becomes "0" after a predetermined time has elapsed from an accelerator-on timing; the control mode is switched from "0" to "1". At this instant, impletion of deceleration control is determined. At this instant, it is determined whether or not the SOC is larger than the threshold value S1; then, because the determination provides the result that the SOC is larger than the threshold value S1, the deceleration control flag of "2" is outputted.

In the interval between the time t4 and the time t5, the deceleration control means 14 receives the deceleration control flag of "2" and performs three-phase short-circuiting of the electric motor so as to reduce the driving-wheel rotation speed and hence decrease the slip rate to a value with which the traction control falls into the controllable region thereof. Instead of deceleration through regenerative torque, the three-phase short-circuiting is implemented; thus, excessive charging is suppressed. The time t5 is the instant when the driving-wheel rotation speed becomes lower than the threshold value V1; the deceleration control flag becomes "0". Because the deceleration control is stopped, the traction control is switched to normal traction control utilizing a target limitation speed calculated from the final virtual vehicle speed.

In the interval between the time t5 and the time t6, the traction control is implemented. The time t6 is the instant when clipping processing with the upper limit value Vlim is applied to the second virtual vehicle speed. In the interval between the time t6 and the time t7, the clipping processing with the upper limit value Vlim is being applied to the second virtual vehicle speed. The time t7 is the instant when the output of the actual wheel rotation speed sensor becomes larger than "0" and hence the final vehicle speeds are switched. In the interval after the time t7, the traction control is performed based on the target limitation speed.

Figure 13:
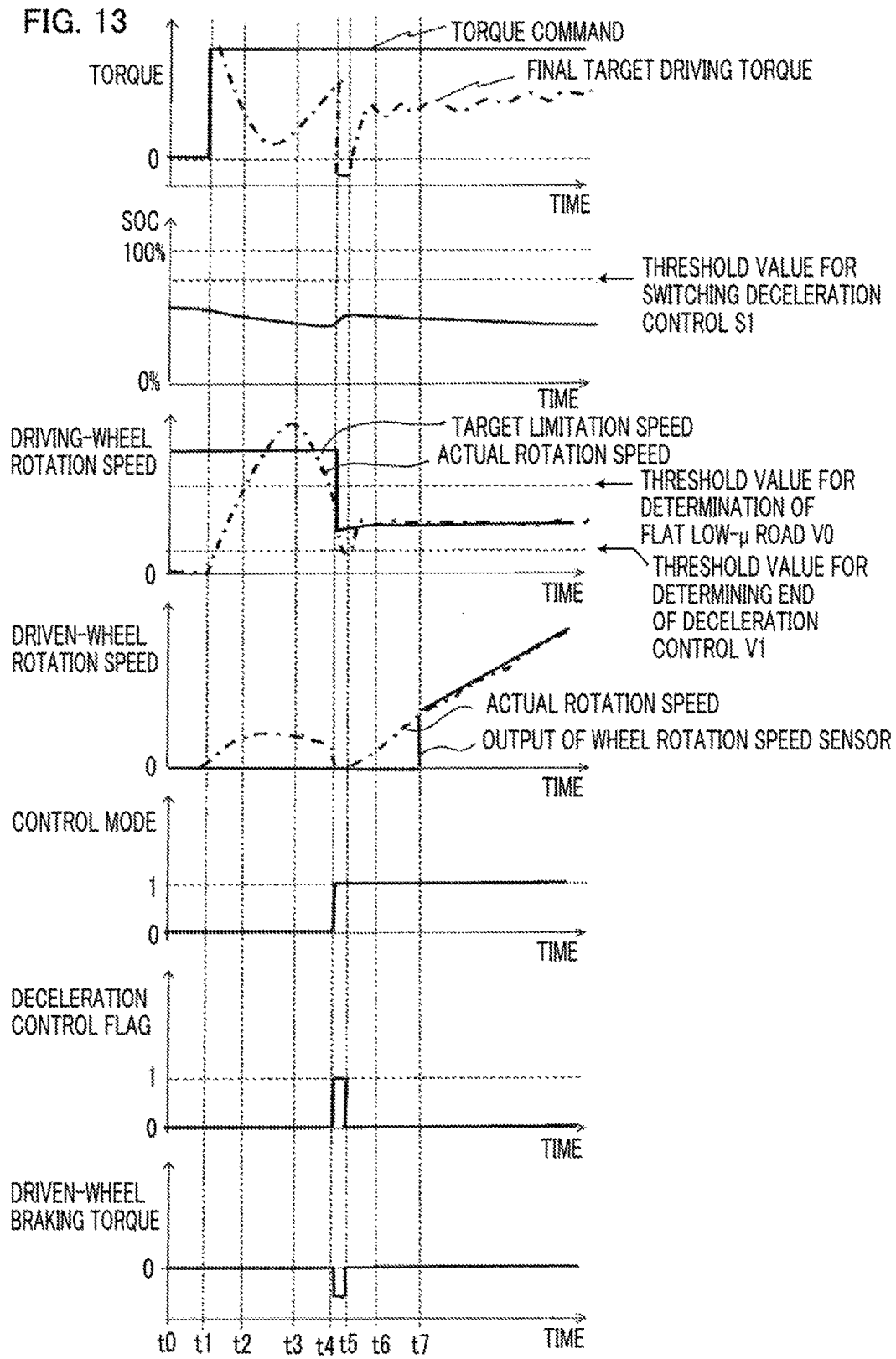
FIG. 13 is an explanatory chart for explaining the operation of a vehicle traction control apparatus according to Embodiment 3 of the present invention.

FIG. 13 is an explanatory chart for explaining the operation of a vehicle traction control apparatus according to Embodiment 3 of the present invention; FIG. 13 represents the respective temporal transitions of the torque, the SOC, the driving-wheel rotation speed, the driven-wheel rotation speed, the control mode, the deceleration control flag, and driven-wheel braking torque at a time when under the condition that the SOC is lower than a threshold value and the driving-wheel rotation speed is reduced by use of regenerative torque, the driven-wheel brake is utilized. In the following explanation, the difference from Embodiment 1 will mainly be explained. In FIG. 13, in the interval between the time t0 and the time t4, the first virtual vehicle speed to be calculated through a virtual vehicle speed map is outputted for a predetermined time after the accelerator has been pressed down.

In the interval between the time t0 and the time t1, the accelerator has not been pressed down and both the respective actual rotation speeds of the driving-wheel and the driven-wheel are "0". The time t1 is the instant when the accelerator is pressed down. In the interval between the time t1 and the time t2, because after the accelerator has been pressed down, the torque increases, both the respective actual rotation speeds of the driving-wheel and the driven-wheel becomes larger. The time t2 is the instant when the driving-wheel rotation speed exceeds a threshold value V0 for performing determination whether or not the present road surface is a road surface that is a flat road and has a low road-surface friction coefficient μ; from this instant, the determination whether or not the present road surface is a road surface that is a flat road and has a low road-surface friction coefficient μ is implemented. In the interval between the time t2 and the time t3, the condition that the driving-wheel rotation speed is larger than the threshold value V0 and the driven-wheel rotation speed is "0" continues; in this interval, the determination whether or not the present road surface is a road surface that is a flat road and has a low road-surface friction coefficient μ is implemented.

The time t3 is the instant when the condition that the driving-wheel rotation speed is larger than the threshold value V0 and the driven-wheel rotation speed is "0" has elapsed for a predetermined time; it is determined that the present road surface is a road surface that is a flat road and has a low road-surface friction coefficient μ, and then the determination result is set to "1". In the interval between the time t3 and the time t4, the traction control is performed based on the target limitation speed. The time t4 is the instant when the first virtual vehicle speed becomes "0" after a predetermined time has elapsed from an accelerator-on timing; the control mode is switched from "0" to "1" and hence implementation of the deceleration control is determined. At this instant, it is determined whether or not the SOC is larger than the threshold value S1; then, because the determination provides the result that the SOC is smaller than the threshold value S1, the deceleration control flag of "1" is outputted.

In the interval between the time t4 and the time t5, the deceleration control means 14 receives the deceleration control flag of "1", outputs the regenerative torque, reduces the driving-wheel rotation speed, and then decreases the slip rate to a value with which the traction control falls into the controllable region thereof. Moreover, because the regeneration occurs, the SOC increases and hence insufficient charging is eliminated. Furthermore, addition of the driven-wheel braking torque in this interval makes it possible to stop the driven wheel and hence to suppress the vehicle from slipping off downward on a slope of a low friction rate μ. As the brake utilized here, a hydraulic brake is considered; however, the responsiveness is further raised by utilizing an electric brake.

The time t5 is the instant when the driving-wheel rotation speed becomes lower than the threshold value V1; the deceleration control flag becomes "0". Because the deceleration control is stopped, the traction control is switched to normal traction control utilizing a target limitation speed calculated from the final virtual vehicle speed. In the interval between the time t5 and the time t6, the traction control is implemented. The time t6 is the instant when clipping processing with the upper limit value Vlim is applied to the second virtual vehicle speed. In the interval between the time t6 and the time t7, the clipping processing with the upper limit value Vlim is being applied to the second virtual vehicle speed. At the time t7, the output of the actual wheel rotation speed sensor becomes larger than "0" and hence the final vehicle speeds are switched.

Each of the respective vehicle traction control apparatuses according to Embodiments 1 through 3 is the "reduction to practice" of at least one of the following inventions.

(1) A vehicle traction control apparatus comprising:
   an electric motor that is supplied with electric power from a battery and outputs driving power to driving wheels of a vehicle,
   a vehicle speed sensor that detects a wheel rotation speed of a driven wheel of the vehicle, and
   a target limitation speed creation means that determines a road-surface condition, based on target driving torque of the vehicle, a wheel rotation speed of the driven wheel, and a driver accelerator operating amount signal, so as to create a target limitation speed of the vehicle,
   wherein target limitation speeds created by the target limitation speed creation means are stepwise switched in accordance with control modes that are categorized based on the slipperiness of a road surface in a speed region where no speed of the driving wheel can be detected,
   wherein the target limitation speed creation means includes
      a control mode switching means that switches the control modes, based on a first virtual vehicle speed of the driven wheel calculated from an accelerator-on time based on the accelerator operating amount signal and a wheel rotation speed of the driven wheel,
      a virtual vehicle speed calculation means that calculates a second virtual vehicle speed of the driven wheel, based on a virtual acceleration corresponding to a control mode selected by the control mode switching means, and
      a virtual vehicle speed selection means that selects one of the first virtual vehicle speed and the second virtual vehicle speed, based on the determined road-surface condition, so as to perform switching from the other one to said one of the first virtual vehicle speed and the second virtual vehicle speed, and
   wherein when the virtual vehicle speed selection means selects one of the first virtual vehicle speed and the second virtual vehicle speed so as to perform switching from the other one to said one of the first virtual vehicle speed and the second virtual vehicle speed, the rotation speed of the electric motor is decelerated to a threshold value with which the travel of the vehicle stabilizes and the deceleration of the electric motor is stopped when the rotation speed of the electric motor becomes lower than the threshold value, and then traction of the vehicle is controlled based on the selected virtual vehicle speed.

This configuration can make a vehicle travel always stably even on a road surface having a large slip rate.

(2) The vehicle traction control apparatus according to (1), wherein a deceleration means for decelerating the rotation speed of the electric motor to the threshold value is selected based on the condition of the battery.

This configuration makes it possible to preform deceleration control in which insufficient charging and excessive charging are suppressed in accordance with the condition of a battery.

(3) The vehicle traction control apparatus according to (2), wherein the selected deceleration means is to make the electric motor output regenerative torque so that the deceleration is performed.

This configuration makes it possible to compensate insufficient charging of the battery through regeneration.

(4) The vehicle traction control apparatus according to (2), wherein the electric motor is formed of a three-phase AC motor, and
   wherein the selected deceleration means is to apply three-phase short-circuiting to an armature winding of the three-phase AC motor so that the deceleration is performed.

This configuration makes it possible to perform deceleration control without consuming electric power and hence to prevent the battery from being excessively charged.

(5) The vehicle traction control apparatus according to any one of (1) through (4), further including a braking means for braking the driven wheels,
   wherein when the rotation speed of the electric motor is decelerated to a threshold value with which travel of the vehicle stabilizes, the braking means applies braking force to the driven wheels, and
   wherein when the rotation speed of the electric motor becomes lower than the threshold value, the braking force applied by the braking means is cancelled.

This configuration makes it possible to suppress the vehicle from slipping off downward on an uphill road of a low road-surface friction coefficient and hence to make the vehicle travel in accordance with the driver's intention.

In the scope of the present invention, the embodiments thereof can freely be combined with one another and can appropriately be modified or omitted.

INDUSTRIAL APPLICABILITY

The present invention can be utilized in the field of a vehicle, especially, an electric automobile.

The invention claimed is:

1. A vehicle traction control apparatus comprising:
   an electric motor that is supplied with electric power from a battery and outputs driving power to driving wheels of a vehicle;
   a vehicle speed sensor that detects a wheel rotation speed of a driven wheel of the vehicle; and
   a target limitation speed creator that determines a road-surface condition, based on target driving torque of the vehicle, a wheel rotation speed of the driven wheel, and a driver accelerator operating amount signal, so as to create a target limitation speed of the vehicle,
   wherein target limitation speeds created by the target limitation speed creator are stepwise switched in accordance with control modes that are categorized based on the slipperiness of a road surface in a speed region where no speed of the driving wheel can be detected,
   wherein the target limitation speed creator includes
      a control mode switcher that switches the control modes, based on a first virtual vehicle speed of the driven wheel calculated from an accelerator-on time based on the accelerator operating amount signal and a wheel rotation speed of the driven wheel,
      a virtual vehicle speed calculator that calculates a second virtual vehicle speed of the driven wheel, based on a virtual acceleration corresponding to a control mode selected by the control mode switcher, and a virtual vehicle speed selector that selects one of the first virtual vehicle speed and the second virtual vehicle speed, based on the determined road-surface condition, so as to perform switching from the other one to said one of the first virtual vehicle speed and the second virtual vehicle speed, and wherein when the virtual vehicle speed selector selects one of the first virtual vehicle speed and the second virtual vehicle speed so as to perform switching from the other one to said one of the first virtual vehicle speed and the second virtual vehicle speed, the rotation speed of the electric motor is decelerated to a threshold value with which the travel of the vehicle stabilizes and the deceleration of the electric motor is stopped when the rotation speed of the electric motor becomes lower than the threshold value, and then traction of the vehicle is controlled based on the selected virtual vehicle speed.

2. The vehicle traction control apparatus according to claim 1, further including a brake for braking the driven wheels, wherein when the rotation speed of the electric motor is decelerated to a threshold value with which travel of the vehicle stabilizes, the brake applies braking force to the driven wheels, and wherein when the rotation speed of the electric motor becomes lower than the threshold value, the braking force applied by the brake is cancelled.

3. The vehicle traction control apparatus according to claim 1, wherein a decelerator for decelerating the rotation speed of the electric motor to the threshold value is selected based on the condition of the battery.

4. The vehicle traction control apparatus according to claim 3, further including a brake for braking the driven wheels, wherein when the rotation speed of the electric motor is decelerated to a threshold value with which travel of the vehicle stabilizes, the brake applies braking force to the driven wheels, and wherein when the rotation speed of the electric motor becomes lower than the threshold value, the braking force applied by the brake is cancelled.

5. The vehicle traction control apparatus according to claim 3, wherein the selected decelerator is to make the electric motor output regenerative torque so that the deceleration is performed.

6. The vehicle traction control apparatus according to claim 5, further including a brake for braking the driven wheels, wherein when the rotation speed of the electric motor is decelerated to a threshold value with which travel of the vehicle stabilizes, the brake applies braking force to the driven wheels, and wherein when the rotation speed of the electric motor becomes lower than the threshold value, the braking force applied by the brake is cancelled.

7. The vehicle traction control apparatus according to claim 3, wherein the electric motor is formed of a three-phase AC motor, and wherein the selected decelerator is to apply three-phase short-circuiting to an armature winding of the three-phase AC motor so that the deceleration is performed.

8. The vehicle traction control apparatus according to claim 7, further including a brake for braking the driven wheels, wherein when the rotation speed of the electric motor is decelerated to a threshold value with which travel of the vehicle stabilizes, the brake applies braking force to the driven wheels, and wherein when the rotation speed of the electric motor becomes lower than the threshold value, the braking force applied by the brake is cancelled.

* * * * *